United States Patent [19]

Heiling et al.

[11] Patent Number: 5,525,656
[45] Date of Patent: Jun. 11, 1996

[54] COATING AGENTS FOR COATING ALUMINUM

[75] Inventors: Peter Heiling; Dieter Gorzel, both of Burghausen; Peter Tschirner, Emmerting, all of Germany

[73] Assignee: Wacker Chemie GmbH, Munich, Germany

[21] Appl. No.: 285,770

[22] Filed: Aug. 3, 1994

Related U.S. Application Data

[63] Continuation of Ser. No. 72,712, Jun. 7, 1993, abandoned.

[30] Foreign Application Priority Data

Jun. 5, 1992 [DE] Germany .............. 42 18 663.3

[51] Int. Cl.$^6$ ..................................... C08K 5/10
[52] U.S. Cl. ............... 524/315; 524/113; 524/361; 524/365; 524/356; 524/366; 524/368; 524/379; 524/549; 524/556; 524/548; 524/555; 524/564; 526/264; 526/271; 526/282; 526/310; 526/317.1; 526/318; 526/318.2
[58] Field of Search ................. 524/315, 365, 524/564, 356, 361, 379, 366, 368, 113, 549, 556, 548, 555; 526/264, 271, 282, 310, 317.1, 318, 318.2

[56] References Cited

U.S. PATENT DOCUMENTS

| | | | |
|---|---|---|---|
| 3,100,755 | 8/1963 | Ehrlich | 524/564 X |
| 3,322,714 | 5/1967 | Martin | 524/315 X |
| 3,594,338 | 7/1971 | Hoh et al. | 524/564 X |
| 3,810,977 | 5/1974 | Levine et al. | 524/564 X |
| 4,141,870 | 2/1979 | Burns | 428/460 X |
| 4,145,338 | 3/1979 | Matsubara et al. | 524/564 X |
| 4,267,094 | 5/1981 | Huhn et al. | 525/902 X |

FOREIGN PATENT DOCUMENTS

| | | |
|---|---|---|
| 2025368 | 3/1991 | Canada . |
| 0117350 | 9/1984 | European Pat. Off. . |
| 0316753 | 5/1989 | European Pat. Off. . |
| 0315278 | 5/1989 | European Pat. Off. . |
| 0376411 | 7/1990 | European Pat. Off. . |
| 0417570 | 3/1991 | European Pat. Off. . |
| 0516201 | 12/1992 | European Pat. Off. . |
| 2838383 | 3/1979 | Germany . |
| 2906118 | 8/1980 | Germany . |
| 993470 | 5/1965 | United Kingdom . |
| 1145564 | 3/1969 | United Kingdom . |

*Primary Examiner*—Judy M. Reddick
*Attorney, Agent, or Firm*—Burgess, Ryan and Wayne

[57] ABSTRACT

The invention provides a coating composition for coating aluminum which is based on vinyl ester copolymers and an organic solvent, the vinyl ester copolymer comprising a) 20 to 90 parts by weight of a vinyl ester of saturated aliphatic monocarboxylic acids having 1 to 5 C atoms, b) 0 to 70 parts by weight of a vinyl ester of saturated aliphatic monocarboxylic acids which have 9 to 10 C atoms and a quaternary C atom in the α-position relative to the carboxyl group, c) 0.05 to 10 parts by weight of one or more ethylenically unsaturated mono- or dicarboxylic acids having 3 to 10 C atoms or anhydrides thereof and d) 0 to 50 parts by weight of one or more ethylenically unsaturated monomers, the homopolymers of which have a glass transition temperature above 30° C.

The coating composition is free of chlorine-containing polymers and also avoids the necessity for using a chlorine-containing primer.

9 Claims, No Drawings

COATING AGENTS FOR COATING ALUMINUM

This application is a continuation of application Ser. No. 08/072,712, filed Jun. 7, 1993, now abandoned.

BACKGROUND OF THE INVENTION

1) Field of the Invention

The invention relates to a coating agent composition for coating aluminum which is based on vinyl ester copolymers.

2) Background Art

Many things in daily life, especially in the foodstuffs, cosmetics and medicines sector, are packaged with flexible materials. These packaging materials also include aluminum foil to a large extent. This can be used by itself or in combination with other substances, such as plastics (PE, PP, PS, PVC, PET and the like, glass or cardboard. To seal the materials mentioned with the aluminum foil, for example, the heat-sealing method is used, which means that the materials are firmly bonded to one another by applying elevated temperature and pressure. However, since untreated aluminum foil is not sealable, it is coated with a polymer film, a heat-sealing coating or else a heat-sealing adhesive. During the sealing operation, the polymer becomes soft due to the elevated temperature and, in conjunction with the pressing pressure applied, ensures, in the cooled state, bonding of the materials to be sealed. A heat-sealing coating should, therefore, have a good adhesion to aluminum foil and should be transparent; it should be possible to paint over it, it should be readily sealable with itself and other materials, storage-stable and physiologically acceptable, and it should have a glass transition temperature of not more than 100° C. and at the same time the highest possible block point in order to avoid sticking of the coated aluminum foil.

Polyacrylates or polymethacrylates such as are described in EP-A1 417 570 (CA-A 2025368) or EP-A2 316 753, and chlorine-containing polymers such as are known from DE-C2 29 06 118 (U.S. Pat. No. 4,267,094) are employed as heat-sealing coatings for coating aluminum foil. A disadvantage of the polyacrylates and polymethacrylates is their generally poor adhesion to aluminum. When these polymers are used, the aluminum foil must be primed beforehand in most cases. Chlorine-containing copolymers are as a rule employed as primers, so that chlorine-containing products, either by themselves or in combination with acrylate systems, are currently used in most cases for laminating aluminum foil. Vinyl chloride/vinyl acetate/vinyl alcohol tarpolymers (DE-OS 28 38 383 =U.S. Pat. No. 4,141,870) and vinyl chloride graft copolymers (EP-A-117 350) are known from the literature for coating aluminum. Recently, however, the use of chlorine-containing products in short-lived packaging material, above all in the foodstuffs sector, has been avoided as far as possible. There is accordingly an urgent need for chlorine-free polymers for coating aluminum, specifically for finishing aluminum foil.

There was, then, the object of providing a coating agent composition specifically for finishing aluminum foil, which neither comprises chlorine-containing polymers nor has to be applied using a chlorine-containing primer. The polymers on which the coating agent is based should therefore have both a good adhesion to aluminum and a good sealing seam strength, in the dry and in the wet state, for use as a heat-sealing coating.

SUMMARY OF THE INVENTION

The invention relates to a coating agent composition for coating aluminum which is based on vinyl ester copolymers and an organic solvent, the vinyl ester copolymer comprising A) 20 to 90 parts by weight of a vinyl ester of saturated aliphatic monocarboxylic acids having 1 to 5 C atoms, B) 0 to 70 parts by weight of a vinyl ester of saturated aliphatic monocarboxylic acids which have 9 to 10 C atoms and a quaternary C atom in the α-position relative to the carboxyl group, C) 0.05 to 10 parts by weight of one or more ethylenically unsaturated mono- or dicarboxylic acids having 3 to 10 C atoms or anhydrides thereof and D) 0 to 50 parts by weight of one or more ethylenically unsaturated monomers, the homopolymers of which have a glass transition temperature above 30° C.

Vinyl acetate or vinyl propionate is preferably employed as component A), in particular, the monomer component A) comprises vinyl acetate.

The Versatic acid vinyl ester mixtures VeoVa 9 and VeoVa 10 (commercial products from Shell Chemie GmbH) or individual constituents of these mixtures are preferred as component B). In particular, component B) comprises VeoVa 9.

The copolymer preferably comprises, as component C), crotonic acid, acrylic acid, methacrylic acid, maleic acid, fumaric acid, itaconic acid, maleic anhydride, allylsuccinic anhydride, mesaconic acid, citraconic acid and/or citraconic anhydride. Maleic anhydride and fumaric acid are particularly preferred.

Methyl methacrylate, tert-butyl acrylate, N-vinylpyrrolidone, N-vinylcarbazole, dimethyl maleate, diisopropyl maleate, diisopropyl fumarate, di-tert-butyl maleate, di-tert-butyl fumarate and 4-tert-butylcyclohexyl acrylate are preferably employed as component D). Diisopropyl fumarate and di-tert-butyl fumarate are particularly preferred.

DESCRIPTION OF THE PREFERRED EMBODIMENTS

In a preferred embodiment, the vinyl ester copolymers have a glass transition temperature $T_g$ of 20° to 100° C., a block point in the range from 30° to 150° C. and a K value of 25 to 120, and comprise:

A) 25 to 85 parts by weight of vinyl acetate,

B) 0 to 55 parts by weight of VeoVa 9,

C) 0.5 to 5 parts by weight of one or more comonomers from the group comprising crotonic acid, acrylic acid, methacrylic acid, maleic acid, fumaric acid, itaconic acid, maleic anhydride, allylsuccinic anhydride, mesaconic acid, citraconic acid and citraconic anhydride and D) 0 to 40 parts by weight of one or more comonomers from the group comprising methyl methacrylate, tertbutyl acrylate, N-vinylpyrrolidone, N-vinylcarbazole, dimethyl maleate, diisopropyl maleate, diisopropyl fumarate, di-tert-butyl maleate, di-tert-butyl fumarate and 4-tert-butylcyclohexyl acrylate.

The following vinyl ester copolymers are particularly preferred:

Vinyl ester copolymers which have a glass transition temperature $T_g$ of 30° to 70° C., a block point in the range from 45° to 100° C. and a K value of 30 to 80 and which comprise A) 40 to 50 parts by weight of vinyl acetate, B) 40 to 50 parts by weight of VeoVa 9, C) 0.5 to 3 parts by weight of one or more comonomers from the group comprising crotonic acid, acrylic acid, methacrylic acid, maleic acid, fumaric acid, itaconic acid and maleic anhydride and D) 5 to 20 parts by weight of one or more comonomers from the group comprising methyl methacrylate, tert-butyl acrylate, N-vinylpyrrolidone, N-vinylcarbazole, dimethyl maleate, diisopropyl maleate, diisopropyl fumarate, di-tert-butyl maleate, di-tert-butyl fumarate and 4-tert-butylcyclohexyl acrylate.

Vinyl ester copolymers which have a glass transition temperature $T_g$ of 30° to 70° C., a block point in the range from 45° to 100° C. and a K value of 30 to 80 and which comprise A) 45 to 55 parts by weight of vinyl acetate, B) 45 to 55 parts by weight of VeoVa 9 and C) 0.5 to 3 parts by weight of one or more comonomers from the group comprising crotonic acid, acrylic acid, methacrylic acid, maleic acid, fumaric acid, itaconic acid and maleic anhydride.

Vinyl ester copolymers which have a glass transition temperature $T_g$ of 30° to 70° C., a block point in the range from 45° to 100° C. and a K value of 30 to 80 and which comprise A) 60 to 85 parts by weight of vinyl acetate, C) 0.5 to 3 parts by weight of one or more comonomers from the group comprising crotonic acid, acrylic acid, methacrylic acid, maleic acid, fumaric acid, itaconic acid and maleic anhydride and D) 15 to 40 parts by weight of one or more comonomers from the group comprising dimethyl maleate, diisopropyl maleate, diisopropyl fumarate, di-tert-butyl maleate, di-tert-butyl fumarate and 4-tert-butylcyclohexyl acrylate.

Vinyl ester copolymers which are most preferred are those which have a glass transition temperature $T_g$ of 30° to 70° C., a block point in the range from 45° to 100° C. and a K value of 30 to 80 and which comprise A) 60 to 85 parts by weight of vinyl acetate, C) 0.5 to 3 parts by weight of fumaric acid and/or maleic anhydride and D) 15 to 40 parts by weight of one or more comonomers from the group comprising dimethyl maleate, diisopropyl maleate, diisopropyl fumarate, di-tert-butyl maleate, di-tert-butyl fumarate and 4-tert-butylcyclohexyl acrylate.

Vinyl ester copolymers which comprise A) 60 to 85 parts by weight of vinyl acetate, C) 0.5 to 3 parts by weight of fumaric acid and/or maleic anhydride and D) 15 to 40 parts by weight of one or more comonomers from the group comprising dimethyl maleate, diisopropyl maleate, diisopropyl fumarate, di-tert-butyl maleate and di-tert-butyl fumarate, are not known in the prior art.

The vinyl ester copolymers can be prepared by free radical polymerization in an organic solvent, such as, for example, ethyl acetate, acetone or tert-butanol, in emulsion with the addition of customary emulsifiers and protective colloids, or in suspension with the aid of protective colloids. The suspension polymerization process is preferably used.

Alkyl sulfates, alkylsulfonates, ethoxylated alcohols and sulfated products thereof have proven to be suitable emulsifiers for the emulsion polymerization. Protective colloids which can be employed successfully in the suspension polymerization are, inter alia, polyvinylpyrrolidone, polyvinyl alcohol, cellulose derivatives, such as hydroxyethyl cellulose, vinyl ester copolymers containing carboxylic acid and also inorganic dispersing agents, such as aluminum hydroxide or magnesium hydroxide.

Both the emulsion and the suspension polymerization can be carried out by the initial mixture process or by the feed process, it being possible for the composition of the feed to be the same as or different from that of any initial mixture present.

Initiators which can be used for the polymerization are, for the emulsion polymerization, the customary water-soluble agents which form free radicals, such as sodium peroxodisulfate, potassium peroxodisulfate, ammonium peroxodisulfate and tert-butyl hydroperoxide, and, for the suspension and solution polymerization, the customary organic peroxides and azo compounds, such as dibutyl peroxydicarbonate, bis(4-tert-butylcyclohexyl) peroxydicarbonate, bis(2-ethylhexyl) peroxydicarbonate, dicetyl peroxydicarbonate, tert-butyl peroxypivalate, dilauryl peroxide, dibenzoyl peroxide, dicumyl peroxide, tert-butyl peroxy-2-ethylhexanoate, 2,2-bis(tert-butylperoxy)butane, tert-butyl hydroperoxide, dicyclohexyl peroxydicarbonate and 2,2'-azoisobutyronitrile.

One initiator by itself or a mixture of various initiators can be used for the polymerization. For the suspension polymerization, it has proved appropriate to use a combination of initiators having different decomposition temperatures (different half-lives at the given polymerization temperature), since a faster and more continuous polymerization reaction is achieved in this way. While the initiator or initiators as a rule are also introduced with the initial mixture for the suspension polymerization, since the organic initiators used diffuse only with difficulty into the beads via the aqueous phase, it is in general more appropriate in the case of the emulsion polymerization and the polymerization in an organic solvent for only some of the initiator or initiators to be initially introduced and for the remainder to be metered in over the course of the reaction. Furthermore, it is often advantageous also to add reducing compounds, such as bisulfite, dithionite, Rongalit or tertiary aromatic amines, or ascorbic acid, in addition to the initiators. The initiators are as a rule employed in amounts between 0.01 and 1.0 % by weight, based on the sum of the monomers. The polymerization temperature is between 30° and 95° C., depending on whether a purely thermal or a redox system is used. Toward the end of the polymerization, the temperature is in general brought to a temperature higher than the initial polymerization temperature in order to bring the reaction to completion.

The vinyl ester copolymers are isolated in the customary manner. In the case of suspension polymers, isolation is carried out by filtration with suction, washing with water and subsequent drying. If the polymerization is carried out in an organic solvent, the copolymer can be isolated by precipitating in a precipitant, such as, for example, methanol or petroleum benzine, in which case the volume ratio of precipitant to solution should be at least 5:1. The polymer can also be isolated by distilling off the solvent. The emulsion polymers can be isolated by casting a film or by coagulation of the emulsion by means of polyvalent metal salts or freezing.

The vinyl ester copolymers are dissolved in an organic solvent for formulation of the heat-sealing coating compositions according to the invention. Suitable solvents are carboxylic acid esters, such as ethyl acetate; ketones, such as acetone and methyl ethyl ketone; alcohols, such as ethanol, propanol and butanol; ethers, such as tetrahydrofuran; and chlorinated hydrocarbons, such as methylene chloride and chloroform. Acetone or ethyl acetate is preferably used as the solvent. The solids content of the solutions is in the range from 10 to 70, preferably 20 to 40, % by weight.

For coating aluminum foils, for example, the coating agent composition according to the invention is applied, for example, by spraying, dipping, brushing, pouring or knife-coating or in another suitable manner. The amount applied here is usually chosen such that a layer of 5 to 50 μm results after drying. Finally, the coated substrate is dried at elevated temperature, if appropriate under reduced pressure.

The coating agents according to the invention which are based on vinyl ester copolymers are suitable above all for providing aluminum with a heat-sealing coating and as a primer for the heat-sealing coating. They exhibit good adhesion even to untreated aluminum foil. The coating is transparent and has a high flexibility at room temperature. The sealing seam strengths of the polymers here surprisingly depend on the preparation method: the strength is generally highest for the polymers prepared by the suspension polymerization process and lowest for the products synthesized in an organic solvent.

The following examples serve to further illustrate the invention. The examples relate to the preparation of the vinyl ester copolymers on which the compositions according to the invention are based and to the preparation of the coating agent solutions. The heat-sealing coating compositions prepared in the examples were subjected to technological testing by the methods described below, the results of which are listed in Table 1.

EXAMPLE 1

42 parts of vinyl acetate, 42 parts of VeoVa 9, 15 parts of tert-butyl acrylate, 1 part of maleic anhydride, 0.1 part of bis(2-ethylhexyl) peroxodicarbonate, 0.1 part of tert-butyl peroxypivalate and 0.05 part of dibenzoyl peroxide were initially introduced into a polymerization vessel with an anchor stirrer, reflux condenser and nitrogen flushing device, and the mixture was diluted with ethyl acetate such that a 40% strength solution was formed. It was then heated up, while flushing vigorously with nitrogen, and kept under reflux for 12 hours. Thereafter, a water pump vacuum was applied for 2 hours and the mixture was cooled to room temperature. The solids content was 65% and was adjusted to 20% with ethyl acetate.

EXAMPLE 2

6 parts of vinyl acetate, 6 parts of VeoVa 9, 12.5 parts of tert-butyl acrylate, 1 part of maleic anhydride, 1.5 parts of polyvinyl alcohol (hydrolysis number 140, Höppler viscosity of a 4% strength solution 5), 1 part of Genapol X 360 (emulsifier from Hoechst), 0.2 part of sodium bicarbonate and 99 parts of water were initially introduced into a polymerization vessel with an anchor stirrer, reflux condenser, nitrogen flushing device and metering device. While being heated up to 70° C., the mixture was flushed intensively with nitrogen. When the stated temperature had been reached, 0.1 part of potassium peroxodisulfate in 6 parts of water was added. After the reaction had started, the following three meterings were effected over a period of 2 hours. Metering 1: 0.2 part of potassium peroxodisulfate in 12 parts of water. Metering 2: 36.5 parts of tert-butyl acrylate, 19 parts of VeoVa 9 and 19 parts of vinyl acetate. Metering 3: 0.4 part of sodium bicarbonate and 3 parts of Genapol X 360 in 18 parts of water. After a reaction time of 5 hours, the internal temperature was increased to 80° C. and a water pump vacuum was applied for 1 hour. After the mixture had been cooled to room temperature, a perfect dispersion having a solids content of 40% resulted. The dispersion was coagulated at −18° C., the coagulate was filtered off, washed with a large quantity of water and dried and a 20% strength solution of the solid resin in ethyl acetate was prepared.

EXAMPLE 3

49 parts of vinyl acetate, 50 parts of VeoVa 9, 1 part of maleic acid, 0.05 part of tert-butyl peroxypivalate and 5 parts of polyvinylpyrrolidone K 30 (product from GAF) were initially introduced into a polymerization vessel with a paddle stirrer, reflux condenser and nitrogen flushing device, and water was added, while stirring, in an amount such that the content of monomers was 35 percent by weight. The mixture was heated to 70 ° C., while flushing vigorously with nitrogen. After a reaction time of 6 hours, a water pump vacuum was applied for one hour. After cooling to room temperature, the resulting beads were filtered off with suction and washed with a large quantity of water. A 20% strength solution of the dry polymer in ethyl acetate was prepared.

EXAMPLE 4

49 parts of vinyl acetate, 50 parts of VeoVa 9, 1 part of itaconic acid, 0.05 part of tert-butyl peroxypivalate and 5 parts of polyvinylpyrrolidone K 30 (product from GAY) were initially introduced into a polymerization vessel with a paddle stirrer, reflux condenser and nitrogen flushing device, and water was added, while stirring, in an amount such that the content of monomers was 35 percent by weight. The mixture was heated to 70° C., while flushing vigorously with nitrogen. After a reaction time of 6 hours, a water pump vacuum was applied for one hour. After cooling to room temperature, the resulting beads were filtered off with suction and washed with a large quantity of water. A 20% strength solution of the dry polymer in ethyl acetate was prepared.

EXAMPLE 5

49 parts of vinyl acetate, 50 parts of VeoVa 9, 1 part of maleic anhydride, 0.05 part of tert-butyl peroxypivalate and 5 parts of polyvinylpyrrolidone K 30 (product from GAY) were initially introduced into a polymerization vessel with a paddle stirrer, reflux condenser and nitrogen flushing device, and water was added, while stirring, in an amount such that the content of monomers was 35 percent by weight. The mixture was heated to 70° C., while flushing vigorously with nitrogen. After a reaction time of 6 hours, a water pump vacuum was applied for one hour. After cooling to room temperature, the resulting beads were filtered off with suction and washed with a large quantity of water. A 20% strength solution of the dry polymer in ethyl acetate was prepared.

EXAMPLE 6

139 parts of water and 2 parts of polyvinylpyrrolidone K 90 as a 5% strength solution in water (a product from GAF) were initially introduced into a polymerization vessel with a paddle stirrer, reflux condenser, metering device and nitrogen flushing device, and the mixture was heated to 70° C., while flushing with nitrogen. When the temperature had been reached, the following meterings were carried out, while stirring vigorously and flushing with nitrogen: Metering 1: a mixture of 49 parts of vinyl acetate, 50 parts of VeoVa 9, 1 part of allylsuccinic anhydride, 0.1 part of tert-butyl peroxypivalate and 0.05 part of dibenzoyl peroxide. Metering 2: 6 parts of water and 0.1 part of bis(2-ethylhexyl) peroxodicarbonate. After a reaction time of 3 hours, the temperature was increased to 83° C., and after a reaction time of a further two hours, a water pump vacuum was applied for one hour. After cooling to room temperature, the resulting beads were filtered off with suction and washed with a large quantity of water. A 20% strength solution of the dry polymer in ethyl acetate was prepared.

EXAMPLE 7

139 parts of water and 2 parts of polyvinylpyrrolidone K 90 as a 5% strength solution in water (a product from GAF) were initially introduced into a polymerization vessel with a paddle stirrer, reflux condenser, metering device and nitrogen flushing device, and the mixture was heated to 70° C., while flushing with nitrogen. When the temperature had been reached, the following meterings were rapidly carried out, while stirring vigorously and flushing with nitrogen: Metering 1: a mixture of 49 parts of vinyl acetate, 49 parts of VeoVa 9, 2 parts of mesaconic acid, 0.1 part of tert-butyl peroxypivalate and 0.05 part of dibenzoyl peroxide. Metering 2: 6 parts of water and 0.1 part of bis(2-ethylhexyl) peroxodicarbonate. After a reaction time of 4 hours, the temperature was increased to 80° C., and after a reaction time of a further two hours, a water pump vacuum was applied for one hour. After cooling to room temperature, the resulting beads were filtered off with suction and washed with a large quantity of water. A 20% strength solution of the dry polymer in ethyl acetate was prepared.

EXAMPLE 8

139 parts of water and 2 parts of polyvinylpyrrolidone K 90 in a 5% strength solution in water (a product from GAF) were initially introduced into a polymerization vessel with a paddle stirrer, reflux condenser, metering device and nitrogen flushing device, and the mixture was heated to 70° C., while flushing with nitrogen. When the temperature had been reached, the following meterings were rapidly carried out, while stirring vigorously and flushing with nitrogen: Metering 1: a mixture of 49 parts of vinyl acetate, 50 parts of VeoVa 9, 1 part of citraconic acid, 0.1 part of tert-butyl peroxypivalate and 0.05 part of dibenzoyl peroxide. Metering 2: 6 parts of water and 0.1 part of bis(2-ethylhexyl) peroxodicarbonate. After a reaction time of 4 hours, the temperature was increased to 80° C., and after a reaction time of a further two hours, a water pump vacuum was applied for one hour. After cooling to room temperature, the resulting beads were filtered off with suction and washed with a large quantity of water. A 20% strength solution of the dry polymer in ethyl acetate was prepared.

EXAMPLE 9

139 parts of water and 2 parts of polyvinylpyrrolidone K 90 as a 5% strength solution in water (a product from GAF) were initially introduced into a polymerization vessel with a paddle stirrer, reflux condenser, metering device and nitrogen flushing device, and the mixture was heated to 70° C., while flushing with nitrogen. When the temperature had been reached, the following meterings were carried out rapidly, while stirring vigorously and flushing with nitrogen: Metering 1: a mixture of 49 parts of vinyl acetate, 50 parts of VeoVa 9, 1 part of citraconic anhydride, 0.1 part of tert-butyl peroxypivalate and 0.05 part of dibenzoyl peroxide. Metering 2: 6 parts of water and 0.1 part of bis(2-ethylhexyl) peroxodicarbonate. After a reaction time of 4 hours, the temperature was increased to 80° C., and after a reaction time of a further two hours, a water pump vacuum was applied for one hour. After cooling to room temperature, the resulting beads were filtered off with suction and washed with a large quantity of water. A 20% strength solution of the dry polymer in ethyl acetate was prepared.

EXAMPLE 10

49 parts of vinyl acetate, 50 parts of VeoVa 9, 1 part of maleic anhydride, 0.1 part of bis(2-ethylhexyl) peroxodicarbonate, 0.1 part of tert-butyl peroxypivalate and 0.3 part of dibenzoyl peroxide were initially introduced into a polymerization vessel with a paddle stirrer, reflux condenser and nitrogen flushing device, and the mixture was diluted with ethyl acetate to the extent that a 40% strength solution was formed. The solution was then heated, while flushing vigorously with nitrogen, and kept under reflux for 20 hours. Thereafter, a water pump vacuum was applied for 2 hours and the mixture was cooled to room temperature. The solids content was adjusted to 20% with ethyl acetate.

EXAMPLE 11

49 parts of vinyl acetate, 50 parts of VeoVa 9, 1 part of crotonic acid and 0.02 part of tert-butyl peroxypivalate were initially introduced into a polymerization vessel with an anchor stirrer, reflux condenser, metering device and nitrogen flushing device, and the mixture was diluted with ethyl acetate such that a 60% strength solution was formed. The solution was then heated to 70° C., while flushing vigorously with nitrogen. After the exothermic reaction had started, 0.03 part of tert-butyl peroxypivalate in 10 parts of ethyl acetate were added over a period of 2 hours. After a reaction time of 4 hours, a water pump vacuum was applied at 70° C. for one hour. After cooling to room temperature, the polymer solution was precipitated in 10 times the amount of petroleum ether, the precipitate was filtered off with suction and dried and a 20% strength solution of the polymer in ethyl acetate was prepared.

EXAMPLE 12

44 parts of vinyl acetate, 45 parts of VeoVa 9, 1 part of maleic anhydride, 10 parts of tert-butyl acrylate, 0.05 part of bis(2-ethylhexyl) peroxodicarbonate, 0.05 part of tert-butyl peroxypivalate, 0.025 part of dibenzoyl peroxide and 2 parts of polyvinylpyrrolidone K 90 as a 5% strength aqueous solution (product from GAF) were initially introduced into a polymerization vessel with a paddle stirrer, reflux condenser and nitrogen flushing device, and water was added, while stirring, in an amount such that the content of monomers was 35 percent by weight. The mixture was heated to 70° C., while flushing vigorously with nitrogen. After a reaction time of 6 hours, a water pump vacuum was applied at a temperature of 80° C. for one hour. After cooling to room temperature, the resulting beads were filtered off with suction and washed with a large amount of water. A 20% strength solution of the dry polymer in ethyl acetate was prepared.

EXAMPLE 13

176 parts of water and 0.5 part of Eballoid, dissolved in 8.6 parts of water (Eballoid is a polyvinyl ester containing carboxyl groups, a product from Wacker Chemie GmbH), were initially introduced into a polymerization vessel with a paddle stirrer, reflux condenser, metering device and nitrogen flushing device, and the mixture was heated to 70° C., while flushing with nitrogen. When the temperature had been reached, the following meterings were carried out rapidly, while stirring vigorously and flushing with nitrogen: Metering 1: a mixture of 44 parts of vinyl acetate, 49 parts of VeoVa 9, 1 part of maleic anhydride, 10 parts of N-vinylpyrrolidone, 0.05 part of tert-butyl peroxypivalate and 0.025 part of dibenzoyl peroxide. Metering 2: 6 parts of water and 0.05 part of bis(2-ethylhexyl) peroxodicarbonate. After a reaction time of 4 hours, the temperature was increased to 80° C., and after a reaction time of one hour, a water pump vacuum was applied for half an hour. After cooling to room temperature, the resulting beads were filtered off with suction and washed with a large amount of water. A 20% strength solution of the dry polymer in ethyl acetate was prepared.

EXAMPLE 14

96.9 parts of water and 2 parts of Tylose H 4000 (a product from Hoechst) were initially introduced into a polymerization vessel with a paddle stirrer, reflux condenser, metering device and nitrogen flushing device, and the mixture was heated to 70° C., while flushing with nitrogen. When the Tylose had dissolved, the following meterings were carried out rapidly, while stirring vigorously and flushing with nitrogen: Metering 1: a mixture of 42 parts of vinyl acetate, 42 parts of VeoVa 9, 1 part of maleic anhydride, 15 parts of tertbutyl acrylate, 0.1 part of tert-butyl peroxypivalate and 0.05 part of dibenzoyl peroxide. Metering 2: 6 parts of water and 0.1 part of bis-(2ethylhexyl) peroxodicarbonate. After a reaction time of 2 hours, the temperature was increased to 80° C., and after a reaction time of one hour, a water pump vacuum was applied for half an hour. After cooling to room temperature, the resulting beads were filtered off with suction and washed with a large amount of water. A 20% strength solution of the dry polymer in ethyl acetate was prepared.

EXAMPLE 15

146 parts of water and 2 parts of polyvinylpyrrolidone K 90 as a 5% strength solution in water (a product from GAF) were initially introduced into a polymerization vessel with a paddle stirrer, reflux condenser, motoring device and nitrogen flushing device, and the mixture was heated to 70° C., while flushing with nitrogen. When the temperature had been reached, the following meterings were carried out rapidly, while stirring vigorously and flushing with nitrogen: Metering 1: a mixture of 49 parts of vinyl acetate, 50 parts of VeoVa 9, 1 part of maleic anhydride, 0.05 part of tert-butyl peroxypivalate and 0.025 part of dibenzoyl peroxide. Metering 2: 6 parts of water and 0.05 part of bis(2-ethylhexyl) peroxodicarbonate. After a reaction time of 6 hours, the temperature was increased to 80° C., and after a reaction time of one hour, a water pump vacuum was applied for half an hour. After cooling to room temperature, the resulting beads were filtered off with suction and washed with a large amount of water. A 20% strength solution of the dry polymer in ethyl acetate was prepared.

EXAMPLE 16

149 parts of water were initially introduced into a polymerization vessel with an anchor stirrer, reflux condenser, metering device and nitrogen flushing device, and were heated to 70° C., while flushing with nitrogen. When the temperature had been reached, the following meterings were carried out rapidly, while stirring vigorously and flushing with nitrogen: Motoring 1: a mixture of 49 parts of vinyl acetate, 50 parts of VeoVa 9, 1 part of maleic anhydride, 0.05 part of tert-butyl peroxypivalate and 0.025 part of dibenzoyl peroxide. Metering 2:6 parts of water and 0.05 part of bis(2-ethylhexyl) peroxodicarbonate. 35 minutes after the exothermic reaction had started, 2 parts of Eballoid as a 5.5% strength aqueous solution were added rapidly. After a reaction time of 6 hours, the temperature was increased to 80° C., and after a further hour, a water pump vacuum was applied for half an hour. After cooling to room temperature, the resulting beads were filtered off with suction and washed with a large amount of water. A 20% strength solution of the dry polymer in ethyl acetate was prepared.

EXAMPLE 17

142 parts of water and 2 parts of polyvinylpyrrolidone K 90 as a 5% strength aqueous solution containing 2% of copper acetate were initially introduced into a polymerization vessel with a paddle stirrer, reflux condenser, metering device and nitrogen flushing device, and the mixture was heated to 70° C., while flushing with nitrogen. When the temperature had been reached, the following meterings were carried out rapidly, while stirring vigorously and flushing with nitrogen: Metering 1: a mixture of 49 parts of vinyl acetate, 50 parts of VeoVa 9, 1 part of maleic anhydride, 0.1 part of tert-butyl peroxypivalate and 0.05 part of dibenzoyl peroxide. Metering 2: 6 parts of water and 0.1 part of bis(2-ethylhexyl) peroxodicarbonate. After a reaction time of 6 hours, the temperature was increased to 80° C., and after a further hour, a water pump vacuum was applied for half an hour. After cooling to room temperature, the resulting beads were filtered off with suction and washed with a large amount of water. A 20% strength solution of the dry polymer in ethyl acetate was prepared.

EXAMPLE 18

189 parts of water and 2 parts of polyvinylpyrrolidone K 90 as a 5% strength aqueous solution were initially introduced into a polymerization vessel with a paddle stirrer, reflux condenser, metering device and nitrogen flushing device, and the mixture was heated to 70° C., while flushing with nitrogen. When the temperature had been reached, the following meterings were carried out rapidly, while stirring vigorously and flushing with nitrogen: Metering 1: a mixture of 65 parts of vinyl acetate, 34 parts of dimethyl maleate, 1 part of maleic anhydride, 0.1 part of tert-butyl peroxypivalate and 0.15 part of dibenzoyl peroxide. Metering 2: 6 parts of water and 0.1 part of bis(2-ethylhexyl) peroxodicarbonate. After a reaction time of 6 hours, the temperature was increased to 80° C., and after a further hour, a water pump vacuum was applied for half an hour. After cooling to room temperature, the resulting beads were filtered off with suction and washed with a large amount of water. A 20% strength solution of the dry polymer in ethyl acetate was prepared.

EXAMPLE 19

189 parts of water and 2 parts of polyvinylpyrrolidone K 90 as a 5% strength aqueous solution were initially introduced into a polymerization vessel with a paddle stirrer, reflux condenser, metering device and nitrogen flushing device, and the mixture was heated to 70° C., while flushing with nitrogen. When the temperature had been reached, the following meterings were carried out rapidly, while stirring vigorously and flushing with nitrogen: Metering 1: a mixture of 69 parts of vinyl acetate, 30 parts of diisopropyl fumarate, 1 part of maleic anhydride, 0.1 part of tert-butyl peroxypivalate and 0.15 part of dibenzoyl peroxide. Metering 2:6 parts of water and 0.1 part of bis(2-ethylhexyl) peroxodicarbonate. After a reaction time of 6 hours, the temperature was increased to 80° C., and after a further hour, a water pump vacuum was applied for half an hour. After cooling to room temperature the resulting beads were filtered off with suction and washed with a large amount of water. A 20% strength solution of the dry polymer in ethyl acetate was prepared.

EXAMPLE 20

189 parts of water and 2 parts of polyvinylpyrrolidone K 90 as a 5% strength aqueous solution were initially introduced into a polymerization vessel with a paddle stirrer, reflux condenser, metering device and nitrogen flushing device, and the mixture was heated to 70° C., while flushing with nitrogen. When the temperature had been reached, the following meterings were carried out rapidly, while stirring vigorously and flushing with nitrogen: Metering 1: a mixture of 65 parts of vinyl acetate, 34 parts of 4-tert-butylcyclohexyl acrylate, 1 part of maleic anhydride, 0.1 part of tert-butyl peroxypivalate and 0.15 part of dibenzoyl peroxide. Metering 2: 6 parts of water and 0.1 part of bis(2-ethylhexyl) peroxodicarbonate. After a reaction time of 6 hours, the temperature was increased to 80° C., and after a further hour, a water pump vacuum was applied for half an hour. After cooling to room temperature, the resulting beads were filtered off with suction and washed with a large amount of water. A 20% strength solution of the dry polymer in ethyl acetate was prepared.

Use technology testing:

The vinyl ester copolymers from Examples 1 to 20 and films thereof on aluminum foil were tested by the methods described below:

Determination of the K value:

The K values were determined in tetrahydrofuran in accordance with H. Fikentscher, Cellulosechemie 13, 58–64 (1932).

Determination of the glass transition temperatures $T_g$:

The glass transition temperatures were determined by means of DSC measurements using an apparatus from Perkin Elmer, the middle point of the glass stage being taken as the glass transition temperature and the heating rate being in each case 20° C./minute.

Determination of the chalking:

To test the chalking, a glass plate was coated with a 250 μm wet film (solids content of the solution 20%) and dried at 120° C. for 20 minutes. It was then stored in water for 5 hours. The chalking was determined visually in accordance with the following scale of ratings:

1=The film shows no chalking.
2=The film shows a slight white haze.
3=The film is slightly white.
4=The film is white.

Determination of the adhesive strength on aluminum foil:

To test the adhesion of the polymer film to an aluminum foil, the foil was first cleaned with ethanol and then coated with a 50 μm wet film (20%) and dried at 120° C. for 20 minutes. A strip of tesafilm adhesive tape was pressed onto this polymer film with firm finger pressure. The adhesive strip was in one case torn off again immediately; the second test was carried out after the coated aluminum foil had been stored in water at room temperature for 24 hours. The film was then wiped dry with a cloth and the tesa strip was stuck on with firm finger pressure and immediately torn off again. The third test was carried out after the coated aluminum foil had been stored in water for 24 hours and then stored at room temperature for 24 hours. Thereafter, the adhesive strip was fixed with firm finger pressure and immediately torn off again. The adhesive strength was evaluated visually in accordance with the following scale of ratings:

1=Good adhesion of the polymer film; no peeling of the coating was found at all.
2=Isolated areas of the polymer film were removed.
3=Several areas of the polymer film were removed.
4=The polymer film shows no adhesion to the aluminum foil and the coating was detached completely.

Determination of the block point:

To determine the block point, the aluminum foil was coated with a 50 μm wet film (20% strength) and dried at 120° C. for 20 minutes. Thereafter, the aluminum foil was folded so that the coated areas lay on top of one another. Testing was carried out in a sealing unit at various temperatures to ascertain whether the polymer films stick together, the sealing time being 30 seconds and the pressing pressure 2.5 Kp/cm². The temperature in °C. at which the aluminum foil can no longer be separated without applying force, that is to say the polymer film became tacky, was stated as the block point or block temperature.

Determination of the sealing seam strength (SSS):

The sealing seam strength was determined by the following method: an aluminum foil coated with a 50 μm wet film (20% strength) and dried at 120° C. for 20 minutes was folded together so that the sides coated with the polymer lay on top of one another. The foil was sealed with a sealing unit at a temperature of 190° C. for 0.5 second under a pressing pressure of 10 Kp/cm². The sealing area was 4×1 cm. The force required to peel the aluminum foil apart again at room temperature was then measured on a unit from Instron. The measurement was carried out both in the dry and in the wet state. For the determination of the SSS in the wet state, the coated and sealed aluminum foil was first stored in water at room temperature for 24 hours and then examined immediately as described above.

In Table 1:

Aluminum adhesion:

1st value=adhesion in the dry state;
2nd value=adhesion after storage in water at room temperature for 24 hours;
3rd value=adhesion after storage in water for 24 hours and storage at room temperature for 24 hours

TABLE 1

| Example | K value | $T_g$ (°C.) | Block point (°C.) | Chalking | Aluminum adhesion | SSS (N/cm) dry | SSS (N/cm) wet |
|---|---|---|---|---|---|---|---|
| 1 | 37.4 | 37 | 55 | 1 | 1/1/1 | 0.88 | 0.84 |
| 2 | 86.3 |  | 60 | 1 | 1/4/4 | 0.82 | 0.24 |
| 3 | 45.8 | 39 | 50 | 1 | 1/1–2/1 | 2.19 | 1.97 |
| 4 | 73.1 | 36 | 55 | 1 | 1/1–2/1 | 2.03 | 1.76 |

TABLE 1-continued

| Example | K value | $T_g$ (°C.) | Block point (°C.) | Chalking | Aluminum adhesion | SSS (N/cm) dry | SSS (N/cm) wet |
|---|---|---|---|---|---|---|---|
| 5 | 46.6 | 42 | 55 | 1 | 1/1/1 | 2.51 | 2.37 |
| 6 | 71.1 | 44 | 50 | 1 | 1/1/1 | 2.13 | 1.46 |
| 7 | 64.2 | 45 | 55 | 1 | 1/1/1 | 2.70 | 2.50 |
| 8 | 55.1 | 34 | 50 | 1 | 1/1/1 | 1.38 | 1.13 |
| 9 | 57.3 | 38 | 55 | 1 | 1/1/1 | 1.08 | 1.12 |
| 10 | 32.4 | 40 | 50 | 1 | 1/1/1 | 0.63 | 0.52 |
| 11 | 41.6 | 25 | 65 | 1 | 1/3/2 | 1.00 | 1.00 |
| 12 | 65.3 | 35 | 55 | 1 | 1/1-2/1 | 2.13 | 1.49 |
| 13 | 26.9 | 36 | 50 | 1 | 1/1/1 | 2.06 | 1.53 |
| 14 | 58.1 | 34 | 50 | 1 | 1/1/1 | 1.63 | 1.46 |
| 15 | 64.4 | 35 | 55 | 1 | 1/1/1 | 2.12 | 1.70 |
| 16 | 43.5 | 36 | 50 | 1 | 1/1/1 | 2.86 | 2.18 |
| 17 | 77.1 | 39 | 50 | 1 | 1/1/1 | 2.04 | 1.48 |
| 18 | 37.4 | 62 | 70 | 1 | 1/1-2/1 | 1.07 | 0.91 |
| 19 | 58.6 | 44 | 65 | 1 | 1/1/1 | 2.63 | 2.52 |
| 20 | 70.1 | 32 | 80 | 1 | 1/4/1 | 0.82 | 0.63 |

What is claimed is:

1. A heat sealable coating agent composition for coating aluminum consisting of a vinyl ester copolymer and an organic solvent, the vinyl ester copolymer being free of chlorine-containing polymers, having a glass transition temperature $T_g$ of 20° to 100° C., a block point in the range from 30° to 150° C. and a K value of 25 to 120 and comprising:

(a) 20 to 90 parts by weight of a vinyl ester of saturated aliphatic monocarboxylic acids having 1 to 5 C atoms, (b) 0 to 70 parts by weight of a vinyl ester of saturated aliphatic monocarboxylic acids having 9 to 10 C atoms and a quaternary C atom in the G-position relative to the carboxyl group, (c) 0.05 to 10 parts by weight of at least one ethylenically unsaturated dicarboxylic acid having 3 to 10 C atoms or anhydrides thereof and (d) 0 to 50 parts by weight of at least one ethylenically unsaturated monomer, the homopolymers having a glass transition temperature above 30° C., all of said parts by weight being based on the total weight of said copolymer.

2. A coating agent composition as claimed in claim 1, wherein the vinyl ester copolymer has a glass transition temperature $T_g$ of 20° to 100° C., a block point in the range from 30° to 150° C. and a K value of 25 to 120 and comprises a) 25 to 85 parts by weight of vinyl acetate, b) 0 to 55 parts by weight of vinyl ester of an alpha-branched saturated mono carboxylic acid containing 9 carbon atoms, c) 0.5 to 5 parts by weight of at least one comonomer selected from the group consisting of maleic acid, fumaric acid, itaconic acid, maleic anhydride, allylsuccinic anhydride, mesaconic acid, citraconic acid and citraconic anhydride, and d) 0 to 40 parts by weight of at least one comonomer selected from the group consisting of methyl methacrylate, tertbutyl acrylate, N-vinylpyrrolidone, N-vinylcarbazole, dimethyl maleate, diisopropyl maleate, diisopropyl fumarate, di-tert-butyl maleate, di-tert-butyl fumarate and 4-tert-butylcyclohexyl acrylate.

3. A coating agent composition as claimed in claim 1 or 2, wherein the vinyl ester copolymer has a glass transition temperature $T_g$ of 30° to 70° C., a block point in the range from 45° to 100° C. and a K value of 30 to 80 and comprises a) 40 to 50 parts by weight of vinyl acetate, b) 40 to 50 parts by weight of vinyl ester of an alpha-branched saturated mono carboxylic acid containing 9 carbon atoms, c) 0.5 to 3 parts by weight of at least one comonomer selected from the group consisting of maleic acid, fumaric acid, itaconic acid and maleic anhydride, and d) 5 to 20 parts by weight of at least one comonomer selected from the group consisting of methyl methacrylate, tertbutyl acrylate, N-vinylpyrrolidone, N-vinylcarbazole, dimethyl maleate, diisopropyl maleate, diisopropyl fumarate, di-tert-butyl maleate, di-tert-butyl fumarate and 4-tert-butylcyclohexyl acrylate.

4. A coating agent composition as claimed in claim 1 or 2, wherein the vinyl ester copolymer has a glass transition temperature $T_g$ of 30° to 70° C., a block point in the range from 45° to 100° C. and a K value of 30 to 80 and comprises a) 45 to 55 parts by weight of vinyl acetate, b) 45 to 55 parts by weight of vinyl ester of alpha-branched saturated mono carboxylic acid containing 9 carbon atoms and c) 0.5 to 3 parts by weight of at least one comonomer selected from the group consisting of maleic acid, fumaric acid, itaconic acid and maleic anhydride.

5. A coating agent composition as claimed in claim 1 or 2, wherein the vinyl ester copolymer has a glass transition temperature $T_g$ of 30° to 70° C., a block point in the range from 45° to 100° C. and a K value of 30 to 80 and comprises a) 60 to 85 parts by weight of vinyl acetate, c) 0.5 to 3 parts by weight of at least one comonomer selected from the group consisting of maleic acid, fumaric acid, itaconic acid and maleic anhydride and d) 15 to 40 parts by weight of at least one comonomer selected from the group consisting of methyl methacrylate, tertbutyl acrylate, N-vinylpyrrolidone, N-vinylcarbazole, dimethyl maleate, diisopropyl maleate, diisopropyl fumarate, di-tert-butyl maleate, di-tert-butyl fumarate and 4-tert-butylcyclohexyl acrylate.

6. A coating agent composition as claimed in claim 5, wherein the vinyl ester copolymer has a glass transition temperature $T_g$ of 30 to 70° C., a block point in the range from 45° to 100° C. and a K value of 30 to 80 and comprises a) 60 to 85 parts by weight of vinyl acetate, c) 0.5 to 3 parts by weight of at least one member selected from the group consisting of fumaric acid and maleic anhydride and d) 15 to 40 parts by weight of at least one comonomer selected from the group consisting of dimethyl maleate, diisopropyl maleate, diisopropyl fumarate and di-tert-butylcyclohexyl acrylate.

7. A coating agent composition as claimed in claim 1, wherein the vinyl ester copolymer is prepared by a suspension polymerization process.

8. A coating agent composition as claimed in claim 1, wherein carboxylic acid esters, ketones, alcohols or ethers are used as the organic solvent to form a solution and the solids content of the solution is from 10 to 70% by weight.

9. A coating agent composition of claim 1 wherein the vinyl ester copolymer consists of a) 60 to 85 parts by weight of vinyl acetate, c) 0.5 to 3 parts by weight of at least one member selected from the group consisting of fumaric acid and maleic anhydride and d) 15 to 40 parts by weight of at least one comonomer selected from the group consisting of dimethyl maleate, diisopropyl maleate, diisopropyl fumarate, di-tert-butyl maleate and di-tert-butyl fumarate.

* * * * *